Patented Oct. 4, 1949

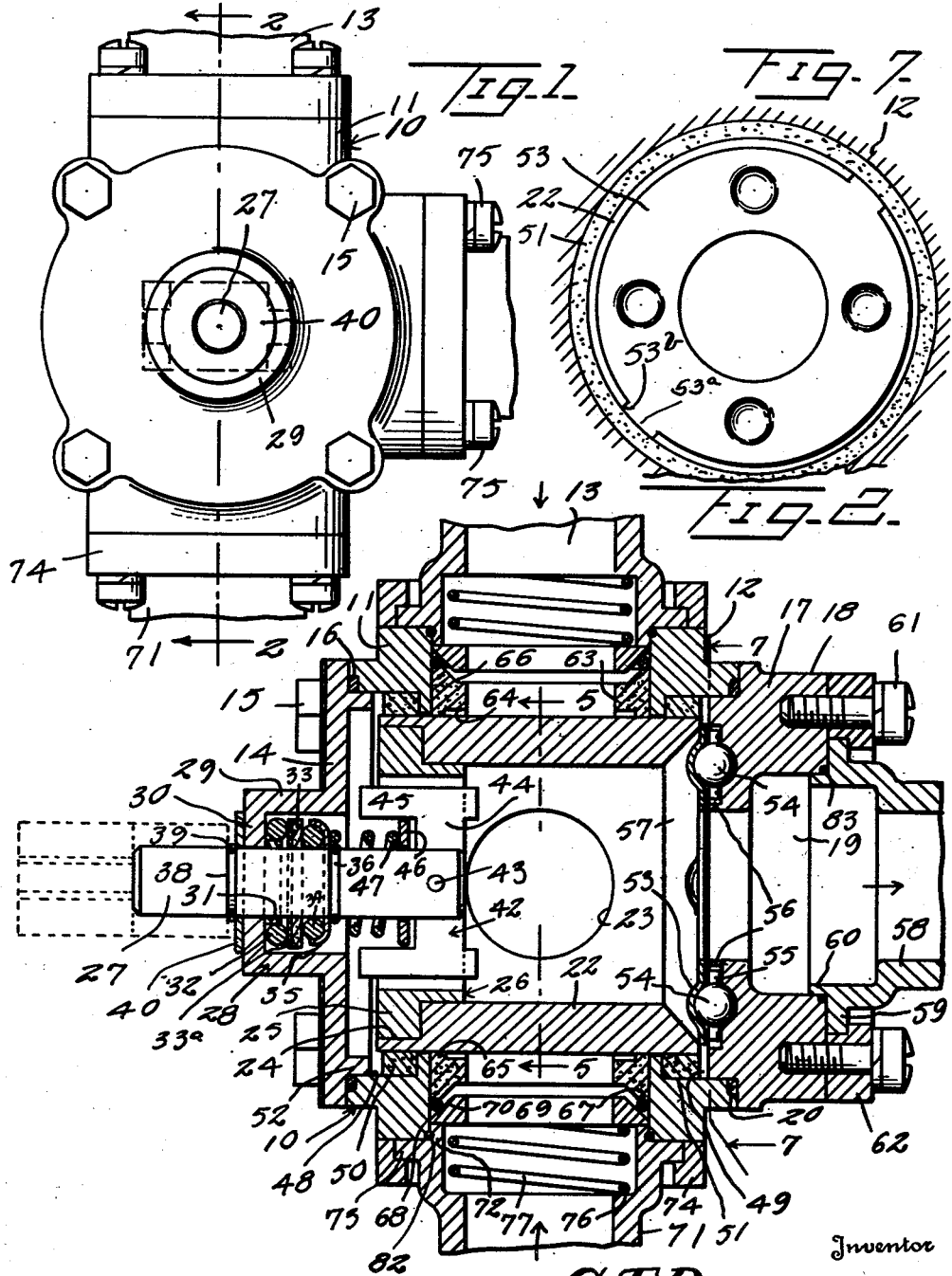
Oct. 4, 1949.  G. T. DOWNEY  2,483,891
VALVE PLUG SEAL
Filed Sept. 28, 1944  2 Sheets-Sheet 1
Inventor
G. T. Downey
By Kimmel & Crowell
Attorneys

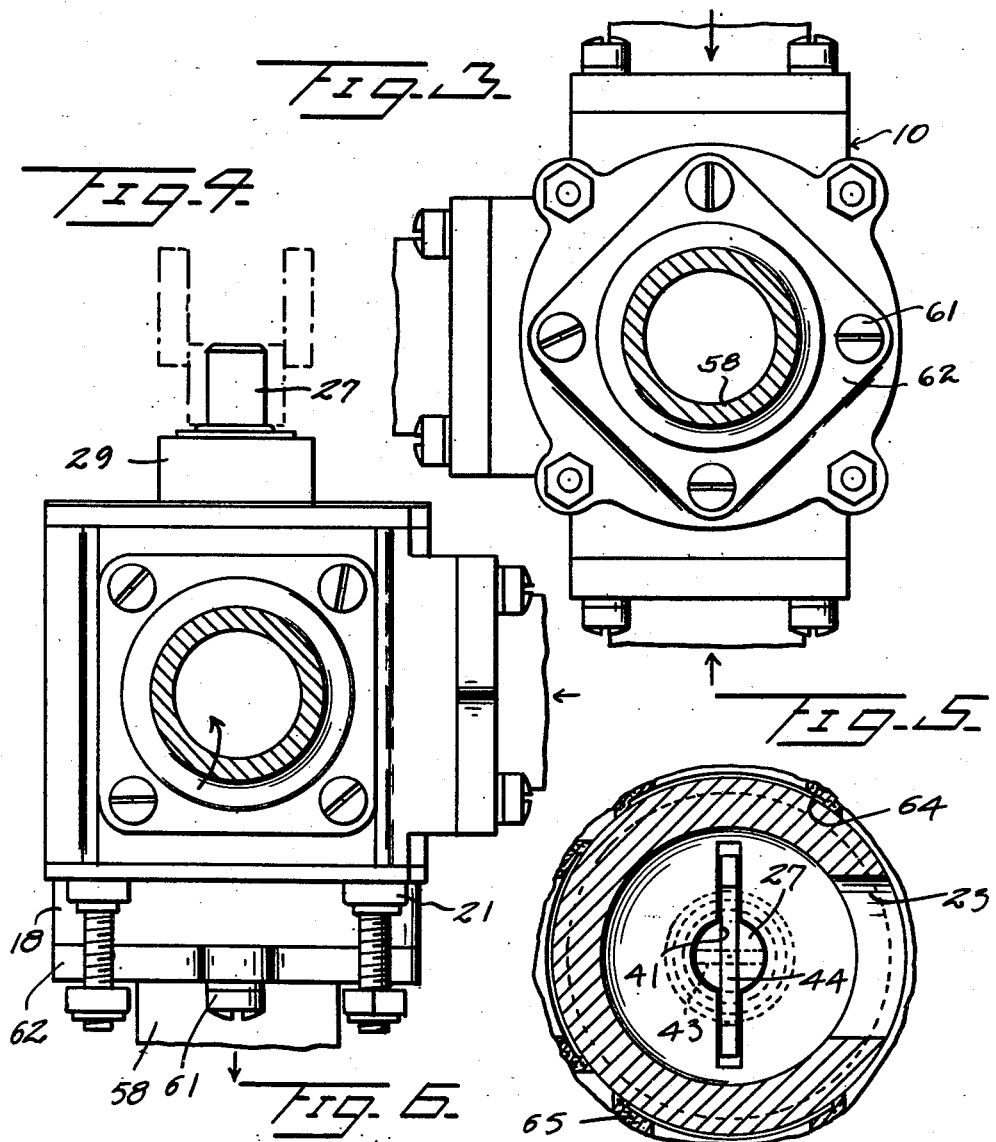
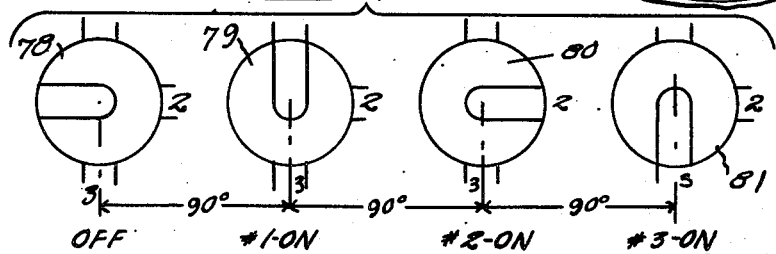

2,483,891

UNITED STATES PATENT OFFICE 2,483,891

VALVE PLUG SEAL

George T. Downey, Corry, Pa., assignor to Aero Supply Mfg. Co. Inc., Corry, Pa.

Application September 28, 1944, Serial No. 556,192

3 Claims. (Cl. 251—95)

This invention relates to valve structures and more particularly to an improved seal between the valve housing and the rotary plug.

An object of this invention is to provide in a valve structure a self-lubricating seal between the valve plug and the housing wherein the seal is constructed in the form of carbon so that a self-seating seal will be provided which will permit quick replacement of the seal.

Another object of this invention is to provide in a valve structure a carbon sealing means for sealing the rotary valve plug with respect to each port, and an improved means for placing the sealing means under the necessary pressure to effect the desired seal.

A further object of this invention is to provide an improved rotary valve plug and means for rotatably mounting the plug in the housing so that the plug will not stick or freeze in the housing.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detail front elevation of a valve constructed according to an embodiment of this invention.

Figure 2 is a sectional view taken on the line 2—2 of Figure 1.

Figure 3 is a detail side elevation partly in section of the outlet side of the valve.

Figure 4 is a detail side elevation partly in section of the valve at one of the intake sides thereof.

Figure 5 is a sectional view taken on the line 5—5 of Figure 2.

Figure 6 is a diagrammatic view showing the various valve positions. Figure 7 is a fragmentary sectional view taken on line 7—7 of Figure 2.

Referring to the drawings, the numeral 10 designates generally a valve housing which is formed of a hollow body 11, having a plurality of radically arranged bosses 12 extending therefrom. The bosses 12 define intake ports 13 by means of which fluid may be permitted to enter the interior of the housing 10. The housing 10 also includes an end wall 14 which is secured by fastening members 15 to one end of the body 11 and a sealing ring or gasket 16 is interposed between the end wall 14 and the adjacent end of the body 11. The opposite end of the body 11 has secured thereto a head 17 which is formed with a boss 18 defining an outlet port 19. A sealing gasket 20 is interposed between the head or end wall 17 and the adjacent end of the body 10. Head 17 is secured to the body 11 by means of fastening members 21 as shown in Figure 4, and these fastening members may be in the form of elongated bolts, which will also provide a mounting means for mounting the valve housing 10 on a suitable support.

A cylindrical valve plug 22 is rotatably mounted in the body 10 and the plug 22 is formed with at least one port 23 between the ends thereof which is adapted to be selectively placed in registry with one of the intake ports 13. Valve plug 22 at its forward end is provided with an annular channel or recess 24 within which the flange 25 of the end wall 26 is adapted to firmly and tightly engage. The end wall 26, as shown in Figure 2, also projects inwardly of the plug 22 so that this end wall 26 may be made of a thickness which may be greater than the thickness of the wall of plug 22. A plug operating shaft 27 is journalled through a bushing 28 which is carried by the end wall 14 and the bushing 28 includes a cylindrical part 29 having an outer end 30 through which shaft 27 rotatably engages. A ring 31 is disposed about shaft 27 and bears against the inner side of bushing wall 30. A sealing ring 32 is also positioned about ring 31 and bears at its outer side against bushing wall 30.

A compression ring 33 is interposed between sealing ring 32 and a second sealing ring 34. Ring 33 is formed of carbon or graphite and a metal wear ring 33a is interposed between compression ring 33 and seal ring 32. A cup shaped washer 35 engages about shaft 27 and bears against the inner sealing ring 34. Shaft 27 is formed with an annular groove 36 and a split locking ring 37 engages in the groove 36 and bears against the inner side of washer 35. Shaft 27 is also formed with a second annular groove 38 and a locking ring 39 engages in groove 38 and bears against a thrust washer 40, which engages against the outer side of bushing wall 30.

By the sealing and locking means hereinbefore described, shaft 27 is rotatably sealed with respect to bushing 28. The inner end of shaft 27 is formed with a transverse slot 41 within which a U-shaped plug operating key 42 engages, and the key 42 is secured in slot 41 by means of a pin 43. Key 42 includes a straight bight 44 and a pair of outwardly extending arms 45 received by the slots 45a formed in the plug end wall 26. An inner washer 46 is positioned about shaft 27 and at its inner side bears against the outer edge of bight 44 and the outer face of the wall 26. A spring 47 is positioned about shaft 27 bearing against the outer side of washer 46 and its opposite or outer end bearing against cup shaped washer 35.

The valve body 11 is formed at the opposite ends thereof with annular recesses 48 and 49 and a pair of ring shaped sealing members 50 and 51 are seated in recesses 48 and 49, respectively, and engage the periphery of plug 22 adjacent the opposite ends thereof. End wall 14 is formed with an annular flange 52 which engages in the annular recess 48 so as to provide for the concentric mounting of shaft 27 with respect to the annular body 11.

In order to provide a means whereby plug 22 may be held in a selected position, I have provided an index ring 53 which is interposed between the adjacent end of plug 22 and head or end wall 17, and is formed with tongues 53ª engaging in slots 53ᵇ formed in plug 22 so that ring 53 will rotate with plug 22. A plurality of anti-friction balls 54 are rotatably carried by pins 55 engaging in slots 56 formed in the end wall 17. Plug 22 is cut out or bevelled, as at 57, so as to provide clearance for the ball detents in ring 53. When plug 22 is turned balls 54 will move plug 22 endwise against the tension of spring 47.

A connector 58 formed with an annular flange 59 and a second flange 60 is secured by fastening members 61 to end wall 17 preferably an annular clamping ring 62 overlaps the flange 59 and fastening members 61 engaged through clamping ring 62. Connector 58 may be extended either straight from the housing 10 or may be extended therefrom at any selected angle, the flange 59 providing a means whereby the connector 58, if made in the form of an angle connector, may be adjusted to any desired position with respect to housing 10.

A ring-shaped sealing member 63 is disposed within boss 12 and at its inner end is formed with a cutout 64 so as to provide a narrow contacting rib 65 engageable against the periphery of plug 22. The outer end of ring 63 is bevelled as at 66, the bevel 66 terminating in a narrow shoulder 67 providing a seat for a ring-shaped seal 68. A pressure ring 69 is disposed outwardly of sealing ring 63 and is formed with an outer bevelled edge 70 parallel with bevel 66. Ring 69 is adapted to bear against sealing ring 68, the latter also providing a cushioning means to cushion the pressure of the ring 69 against ring 63. An intake connector 71 which is formed with an inner annular flange 72 engages within port 13 and is provided with an outer flange 73 bearing against the outer end of boss 12. A clamping ring 74 overlies flange 73 and is secured by fastening members 75 to boss 12.

Connector 71 is formed with an inner shoulder 76 against which the outer end of a seal compressing spring 77 is adapted to engage. The inner end of spring 77 bears against pressure ring 69 and constantly holds ring 69 in engagement with cushioning ring 68 and the latter applies pressure to sealing ring 63. Rings 50, 51 and 63 are preferably made of carbon, which will provide a self-lubricating seal for sealing plug 22 in the housing and for sealing the intake ports with respect to the plug 22. Inlet fitting 71 is sealed with respect to boss 12 by means of a sealing ring 82, and outlet 58 is sealed with respect to boss 18 by means of a sealing ring 83.

In the use and operation of this valve structure, connector 71 may be connected to suitable fluid conducting means and connector 58 may be connected to desired fluid conducting means. When valve plug 22 is in a cut off position, this plug will assume the position shown at 78 in Figure 6. If one intake port 13, such as the No. 1 intake port, is to be connected with outlet port 19, plug 22 is turned to register port 23 with the No. 1 intake port. In this position, valve plug 78 will be in the position indicated at 79 in Figure 6. If the intermediate or No. 2 port is to be connected with plug 22, the latter is turned to register port 23 with the intermediate or No. 2 port, and plug 22 will be in the position shown at 80 in Figure 6. If the No. 3 inlet port is to be connected with the outlet port, plug 22 is turned to the position shown at 81 in Figure 6.

What I claim is:

1. A valve structure comprising a housing having a cylindrical bore and a plurality of intake ports communicating with said bore, said housing including opposite end walls and one of said walls having a central outlet port, a cylindrical valve plug rotatable in said bore and formed with a peripheral port registerable with a selected one of said intake ports, said plug having one end thereof open and confronting said outlet port, a shaft extending rotatably through the other of said housing end walls, a radially extending key carried by the inner end of said shaft, slots formed in the other end of said plug for slidably receiving said key whereby said plug is rotatable with said shaft, sealing means disposed about said shaft and confronting the inside of said other housing end wall, a washer loosely disposed about said shaft and adapted to bear against said other end of said plug, spring means interposed between said sealing means and said washer for constantly urging said plug in the direction of said outlet port and said sealing means against said other housing end wall, an index plate fixedly carried by said plug between said plug and said one wall of said housing, and means carried by said one end wall of said housing engaging said index plate for yieldably securing said plug in selected rotated position.

2. A valve structure as set forth in claim 1, wherein said index plate is formed with circumferentially spaced apart detents and said last named means includes anti-friction ball bearings rotatably secured in said one end wall of said housing.

3. A valve structure as set forth in claim 1, including an annular sealing member disposed in each of said intake ports for engagement with the surface of said plug and formed with a bevelled outer edge, a sealing ring seating on said outer edge, a pressure ring having a bevelled inner edge for engagement with said sealing ring for compressing the latter between said sealing member and said pressure ring, and spring means in said intake ports bearing against said pressure ring for constantly urging the latter against said sealing ring.

GEORGE T. DOWNEY.

REFERENCES CITED

The following references are of record in the file of this patent:

UNITED STATES PATENTS

| Number | Name | Date |
|---|---|---|
| 743,511 | Huxley | Nov. 10, 1903 |
| 1,062,064 | Ward | May 20, 1913 |
| 1,125,530 | Heymann | Jan. 19, 1915 |
| 1,509,562 | MacGregor | Sept. 23, 1924 |
| 1,939,141 | Schultis | Dec. 12, 1933 |
| 1,954,018 | Miller | Apr. 10, 1934 |
| 2,030,458 | McKellar | Feb. 11, 1936 |
| 2,198,386 | Hiester | Apr. 23, 1940 |
| 2,314,512 | Parker | Mar. 23, 1943 |
| 2,319,347 | Reed | May 18, 1943 |
| 2,375,633 | Downey | May 8, 1945 |